United States Patent [19]
Trayford et al.

[11] 3,876,142
[45] Apr. 8, 1975

[54] AERIAL SPREADING OF PARTICULATE MATERIAL

[75] Inventors: Roslyn Swinburne Trayford, Montmorency; Edward Colin Tremayne, North Coburg, both of Australia

[73] Assignee: Commonwealth Scientific and Industrial Research Organization, Campbell, Australia

[22] Filed: Oct. 29, 1973

[21] Appl. No.: 410,461

[30] Foreign Application Priority Data
Oct. 31, 1972  Australia............................ 1045/72

[52] U.S. Cl. .................. 239/1; 239/171; 239/650; 244/136; 169/53
[51] Int. Cl........ B05b 1/02; B05b 17/02; B64d 1/16
[58] Field of Search .......... 239/171, 176, 650, 652, 239/664, 668, 1; 169/53, 62; 244/136, 136.5

[56] References Cited
UNITED STATES PATENTS

| | | | |
|---|---|---|---|
| 1,691,205 | 11/1928 | Morse | 244/136 |
| 1,761,889 | 6/1930 | Junkers | 244/136 |
| 2,356,119 | 8/1944 | Quick | 239/171 UX |
| 2,473,212 | 6/1949 | Monson | 244/136 |
| 2,986,360 | 5/1961 | Rutten | 244/136 |
| 3,525,473 | 8/1970 | Pickell | 239/171 |
| 3,533,582 | 10/1970 | Roth | 244/136 |

*Primary Examiner*—Robert S. Ward, Jr.

[57] ABSTRACT

A body to serve as a spreader for particulate material dropped from an aircraft, said body having a pair of upright side walls which diverge away from one another and progressively decrease in height in the front to rear direction and a pair of ledges extending longitudinally of the side walls and projecting outwardly one from the botton of each side wall.

12 Claims, 9 Drawing Figures

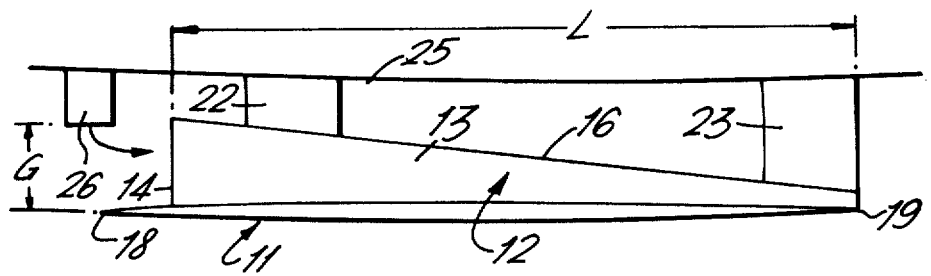
FIG.1.
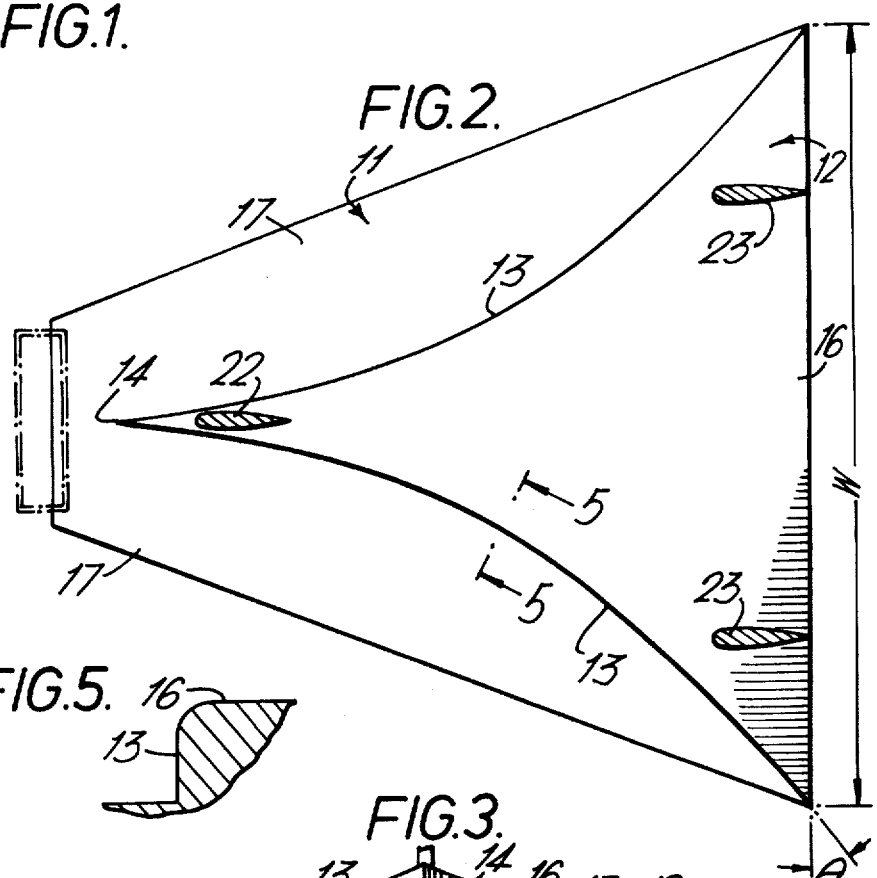
FIG.2.
FIG.5.
FIG.3.
FIG.4.

AERIAL SPREADING OF PARTICULATE MATERIAL

BACKGROUND OF THE INVENTION a. Field of the Invention

This invention relates to aerial spreading of particulate material. The most common particulate material spread from aircraft is superphosphate granules but other materials such as granulated trace elements and plant seeds can also be spread in this manner.

An aircraft superphosphate spreader should ideally possess the following characteristics:

1. The ability to achieve a wide and even swath
2. Low aerodynamic drag
3. Non-blocking at high flow rates including dumping
4. Self cleaning or easy to clean
5. Low weight
6. Low initial cost
7. Low maintenance
8. Adequate ground clearance
9. Strength to resist impacts from stones, grass and superphosphate
10. Structural integrity
11. Quick detachability from aircraft
12. Non-interference with aircraft handling characteristics Description of the Prior Art In order to spread the superphosphate particles from the centre line of an aircraft it is desirable that they be given a substantially lateral velocity. Whilst the lateral component of the downwash field does provide some velocity this action must be supplemented to achieve the best results. If individual superphosphate particles are accelerated longitudinally relative to the aircraft by the air stream, after leaving a discharge hopper in the body of the aircraft, and then deflected they may be made to achieve an initial lateral velocity which is significant fraction of the aircraft velocity. This lateral component could be imparted by mechanical means such as a flinger or by means of a powered blower. The present invention, however, provides a much simpler device in the form of a specially shaped body to be suspended from the aircraft behind the position at which the particulate material is to be discharged so as to deflect the material outwardly.

BRIEF SUMMARY OF THE INVENTION

According to the invention there is provided, for suspension from an aircraft, a body to serve as a spreader for particulate material dropped from the aircraft, said body having a pair of upright side walls which diverge away from one another and progressively decrease in height in the front to rear direction and a pair of ledges extending longitudinally of the side walls and projecting outwardly one from the bottom of each side wall.

The side walls may extend from a prow at the front end of the body and they may curve rearwardly and outwardly from the prow. They may, for example, be formed to outwardly concave generally parabolic curvature.

The body may have a top wall extending between the upper margins of the side walls. More particularly the top wall may be substantially planar.

The body may have a generally flat under-surface extending between the outer edges of the ledges. This under-surface may be the under-surface of a flat base plate the outer parts of which define the ledges, the side walls extending up from the base plate within those outer parts.

The base plate may taper in thickness toward sharp edges at its front, rear and outer margins.

In order that the invention may be more fully explained one particular embodiment will now be described in some detail with reference to the accompanying drawings in which:

BRIEF DESCRIPTION OF THE SEVERAL VIEWS OF THE DRAWING

FIG. 1 is a side elevational view of a body shaped in accordance with the invention;

FIG. 2 is a plan view of the body shown in FIG. 1;

FIG. 3 is a front elevational view of the body;

FIG. 4 is a rear elevational view of the body;

FIG. 5 is a fragmentary cross-section on the line 5—5 in FIG. 1; and

DETAILED DESCRIPTION

Figure 6:
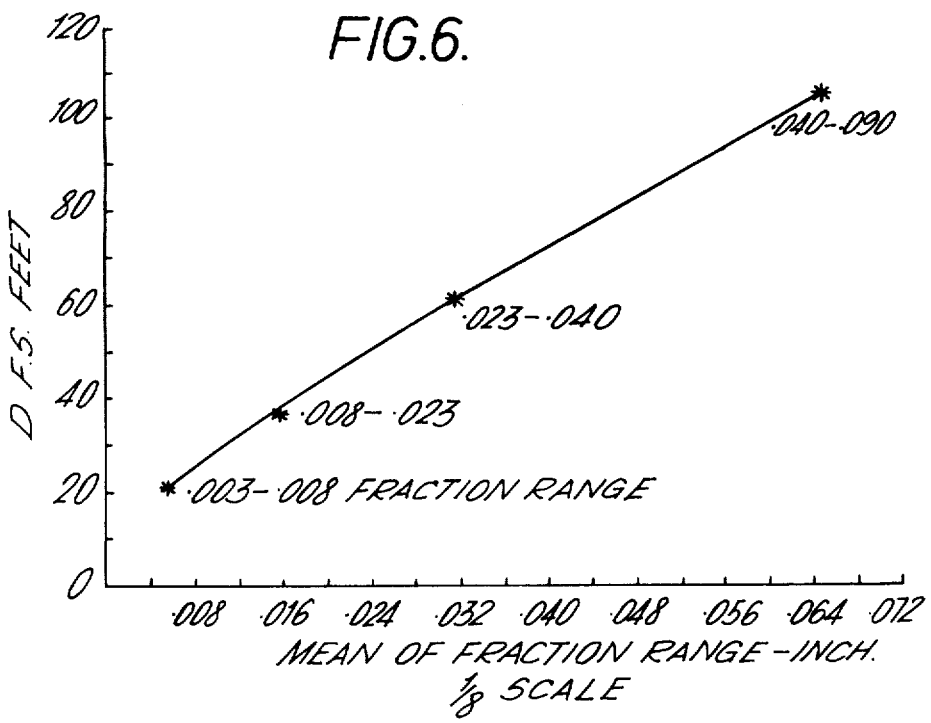
FIGS. 6 to 9 give the results of tests carried out on models to establish the optimum shape of the body.

The illustrated body may be constructed of sheet metal. It comprises a base plate denoted generally as 11 on which is mounted a generally tetrahedral structure 12. The base plate is trapezium-shaped, being 2 feet wide at the front of the body, 8 feet wide at the rear and approximately 8 feet long.

The tetrahedral structure is 7 feet long and 8 feet wide. It comprises a pair of upright side walls 13 which diverge outwardly from one another in the front to rear direction. More particularly, they curve rearwardly and outwardly from an upright prow 14 which they define at the front end of the body. They are shaped to outwardly concave generally parabolic curvature and progressively decrease in height in the front to rear direction. More particulary, they are 1 foot high at the front end of the body and only 1 ⅞ inches high at the rear end of the body. The decrease in height is regular such that their upper margins conform to an inclined plane. These margins are connected by a flat top wall 16 disposed in this plane.

As indicated in FIG. 5 the corners between the top wall 16 and side walls 13 are radiused at positions intermediate the front and rear ends of the body. This radius, however, tapers to zero at both the front and rear ends.

Base plate 11 projects forwardly of prow 14 by about 1 foot. It also projects outwardly beyond the upright side walls 13 so that its outer parts define ledges 17 which extend longitudinally of side walls 13 and project outwardly one from the bottom of each side wall. Side walls 13 diverge to meet the outer edges of the base plate at the rear of the body, the ledges therefore vary in width along their length. More particularly, they increase in width from the front of the body towards its mid-parts and then progressively decrease in width to zero width at the rear end of the body.

The side margins of base plate 11 are tapered in thickness so as to reduce to sharp edges 15 as seen in FIGS. 3 and 4. The front and rear margins of the plate are similarly tapered to thickness to a rounded leading edge or nose 18 and a sharp trailing edge 19. As seen in FIG. 2 the lower edges of side walls 13 are shaped to follow the taper of the base plate.

For use in aerial spreading of superphosphate the illustrated body is slung beneath an aircraft 25 by any convenient means such as a supporting framework or by the front central strut 22 and laterally spaced rear struts 23 shown in FIGS. 1 and 2. It is mounted with the forward part of plate 11 in advance of prow 14 disposed beneath a hopper 26 through which granulated superphosphate is discharged so that the superphosphate granules enter the aircraft slip stream immediately in advance of prow 14. The shape of the body is such that the slip stream is smoothly diverted with a minimum of separation and low drag. It diverts, accelerates and spreads the superphosphate material. The ledges 15 retain the material in the influence of the body for the purpose of spreading. Because side walls 13 progressively decrease in height toward the rear of the body superphosphate particles can spill over the top edges of these walls to provide a quite even spread across the swath behind the body.

The configuration of the illustrated body is an optimum design derived from tests on scale models. More particularly the optimum shape was derived from tests of ⅛ scale models, the results were confirmed by the tests of a 1/6th scale model shaped to the optimum geometry and a full size spreader was then constructed to the optimum design and tested.

In order to test model spreaders account must be taken of the scale laws involved. The two non-dimensional numbers expected to affect the result are Reynolds number (the ratio of viscous to inertia forces) and Froude number (the ratio of gravity to inertia forces). If scaling is based on Reynolds number:

$$\frac{\rho L V}{\mu} \text{ (full scale)} = \frac{\rho_m L_m V_m}{\mu_m}$$

For the same material and medium:

$$L V = L_m V_m$$

or $$\frac{V_m}{V} = \frac{L}{L_m} = S$$

where S = scaling factor.
i.e.

$$V_m = S \cdot V$$

However, if it is based on Froude number:

$$\frac{V^2}{L g} = \frac{V_m^2}{L_m g}$$

or $$\frac{V_m}{V} = \sqrt{\frac{L_m}{L}}$$

i.e.

$$V_m = \frac{V}{\sqrt{S}}$$

Clearly the two non-dimensional numbers are incompatible and the particular part of the spreading sequence which they may affect must be considered. A Reynolds number may be associated with the spreader and with the particle. Particle Reynolds numbers will be about two orders of magnitude lower than that associated with the model. As the effects of gravity on particles moving over the model are minimal compared to that of particles moving away from the model it is better to associate the Froude number with the particles falling distant from the spreader.

In the spreading action which takes place in the vicinity of the spreader, the majority of particles will not be in the proximity to the boundary layer of the model, and furthermore, flow changes in the region adjacent to the front faces of the spreader where the spreading action takes place are not likely to be affected by boundary layer changes due to scale conditions. Therefore a Reynolds number based on the particle size appears more appropriate. This means that the particles whether full scale or model will be operating in a region of sensibly constant drag coefficient with Reynolds number (considering also the variability due to the irregular nature of the particles). As the drag coefficient controls the force available for spreading action, it has been assumed better to choose Froude number scaling at the expense of Reynolds number. The trajectories of the particles in the far field away from the model which determine range are clearly gravity dependent and therefore Froude number was judged the most important non-dimensional number to hold constant. The Reynolds numbers and Froude numbers used are shown in Table I.

The models were tested on an indoor rig set up in a bay of 22ft. × 70ft. More particularly the model was propelled along a 60 foot length of wire over a drop zone allowing 10 feet for acceleration, 35 feet for free running and 15 feet for braking. The models were suspended from a carrier which also dropped particulate material in front of them.

Collection was made in cardboard shoe boxes, 1.02ft. × 0.54ft. in area, occupying the whole width of the bay. The deposit in each box was weighed to 0.005 gram and the swath width was calculated as 3½ weighted standard deviations. This width was named dispersion and was used to compare test results and relate them to full scale. The chief assumption in the use of dispersion as a measure is that the deposits are normally distributed.

The results of the model testing were as follows
⅛th Scale Model a. Optimum Shape The variables considered were the length/width ratio, the tip angle, the depth or gap between the hopper opening and the flat plate, and the fore and aft opening dimension of the hopper gate. Before embarking on an experimental design of 27 runs, some runs were made varying only length/width ratio and exit angle to try and determine the general area in which optimum performance might be found. Length/width ratios of 0.4 to 1 and exit angles of 0° to 54° were tried. From these tests and consideration of the required mass flows, the levels of a 4 factor design were nominated with a ⅓rd replication. Each factor was tested at 3 levels. The length/width ratio was tested at 0.6, 0.8 and 1, the exit angle at zero, 18° and 36°, the vertical depth at 1, 1½ and 2 in, and the gate opening at 3/16, ¼ and ⅜ in.

With four factors at three levels using a ⅓rd replication, 27 runs were made; each consisted of ten passes over a dropping zone so as to build up sufficient deposit to justify weighing. All 27 runs were made with the same scaled particle size fraction, 0.008 – 0.023 inches. As the design was a ⅓rd replicate, only three of the six first order interactions could be obtained. In effect information on the interactions containing the exit angles were lost. The six interactions can be listed as -

R × G     A × R
G × M     A × G
M × R     A × M where
R = Length/width ratio
G = Depth between hopper and flat plate
M = Gate opening of hopper
A = Exit angle of spreader.

Observations showed that the amount deposited strongly affected dispersion, having an inverse relation to it. Therefore results were analysed after the effect of the flow rate of material (Q) was removed, by treating it as a covariant.

Three analyses are shown in Table II. The first is the analysis on D including the effects of Q, the second an analysis of Q transformed so that $Q' = \ln Q$ and the third an analysis of D' which is D with the effects of Q removed. Justification for this process can be seen by noting that Q' is significant for the G linear and M linear effects.

The analysis of D' shows significant linear and quadratic effects in R, A, G and R.M. The regression equations when averaged for Q gave preferred values of R, A and G. In the case of R, the maximum dispersion averaged over the three levels of M is between levels 2 and 3. With A the preferred value is at level 3 with a possible maximum beyond the boundary. The preferred value of G is similarly at level 3 with indication of a maximum beyond the boundary.

The above values lead to a prototype spreader geometry having a length (L in FIG. 1) of 7 ft. (which approaches the maximum practical length allowable), a width (W in FIG. 2) of 8 ft., and an exit angle ($\theta$ in FIG. 2) of 36° and a depth (G in FIG. 1) between the flat plate and the hopper of 16 inches. Of course, these dimensions may be varied to accommodate the spreader to different aircraft. The particular dimensions were chosen as being suitable for use with a Beaver aircraft. It is always preferred, however, that the following dimensions be within the following ranges:

Length to width ratio R : 0.8 to 1.0
Exit angle $\theta$ : 18° to 54°
Depth G : 6 to 20 inch.

In practice the height of prow 14 may be made substantially equal to G.

Photographs taken at runs with increasing mass flow and increasing depth between the opening and the hopper show that with increasing mass flow the spreader tends to overload, the material passes under the plate and is not acted upon. At a small depth the material is constricted (except at the smallest mass flows) and as the depth increases more of the material flow reacts with the spreading surfaces. However, at a larger depth it can be expected that the material will stream to the rear unimpeded, so that optimum depths can be visualized.

b. Particle Size Effect As no information on the effect of varying particle size in an aerodynamic spreader was known, a test with four size fractions of superphosphate particles was carried out using the carrier with one model (R = 0.66, A = 18°, G = 1inch ). The results (FIG. 6) show an increase in dispersion with increasing fraction size. Within the limit of sufficient particles for agronomic coverage per unit area, it can be concluded that the largest fraction of particle sizes should be used. This is similar to the conclusion reached in regard to mechanical spreaders. Practical granular fertilizers have a range of sizes, so that provided the mean size is 0.1 inch or greater the end result should conform with the observations of Williams and Lipsett, who examined the agronomic effects of different particle size fractions under various soil conditions.

1/6th Scale Model a. Confirmation of ⅛th Scale Results Based on the results of the ⅛th scale tests, a 1/6th scale model using the optimum geometry was constructed and tested. The model had a length/width ratio of 0.866, a gap of 2 in., and an exit angle of 35°. The fraction size tested was 0.023 to 0.039 in., slightly larger than the correct scaling for 1/6th scale test fractions (0.011 to 0.033 in.), due to difficulty in obtaining all the required fraction sizes.

Figure 7:
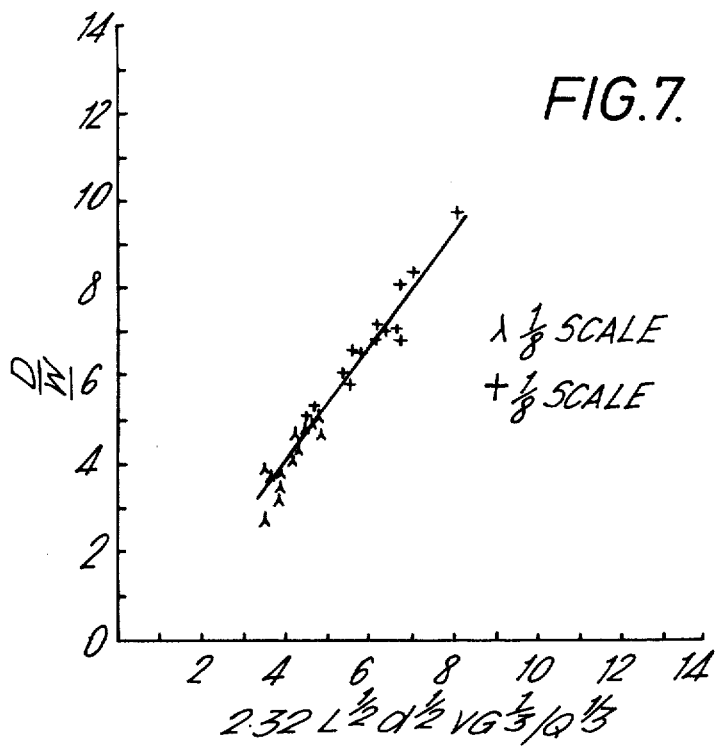
Figure 8:
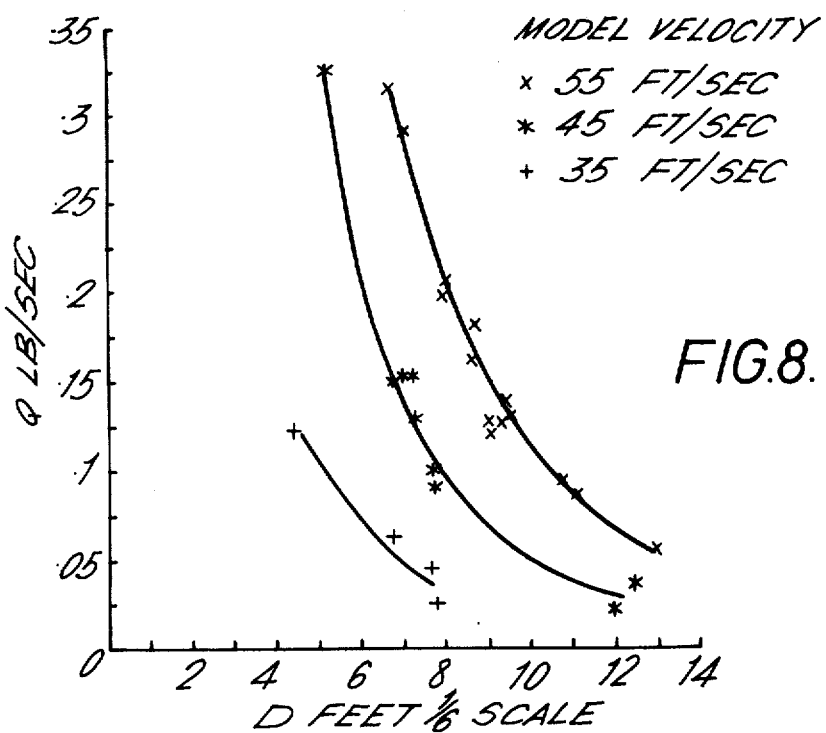
Figure 9:
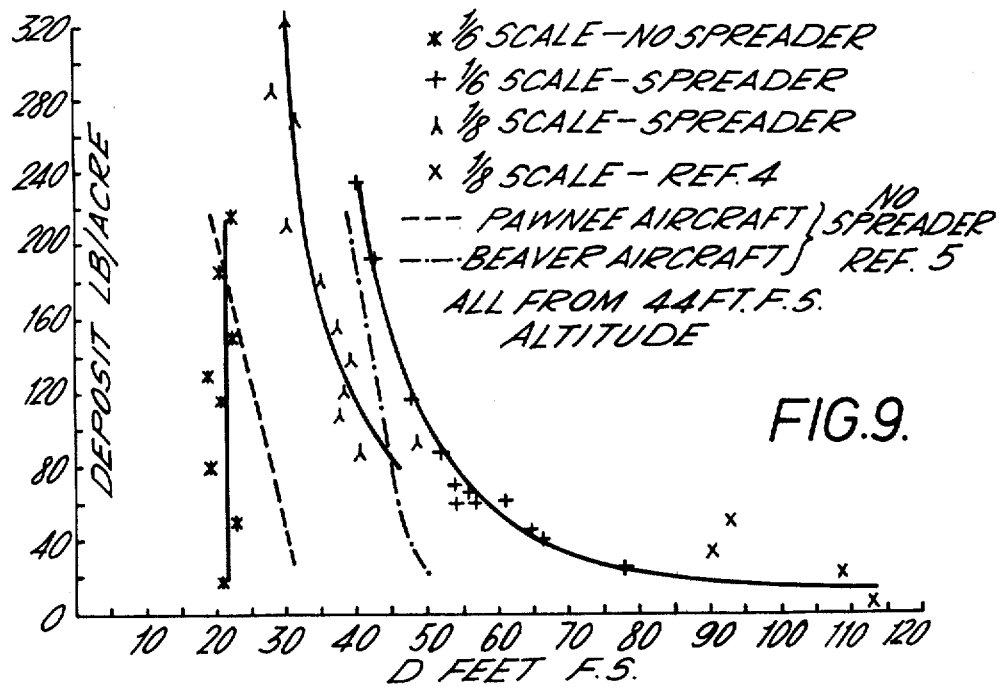

The results (FIG. 7) plotted as the non-dimensional dispersion D/W against a non-dimensional expression which fits the data, obtained in a subsequent regression analysis discussed later, show a close relationship between the ⅛th scale and 1/6 th results. The 1/6 th scale results yield a higher D/W presumably because of the larger than scale size particles used and because the 1/6 th scale is an optimised model compared to the ⅛th scale (see also FIG. 9). Other unknown factors may of course also account for part of the difference.

b. Velocity Effect A series of runs at different velocities was made to enable variation of dispersion with velocity to be examined. The mass flow was varied for each velocity setting so that a family of three curves at 10 ft/sec intervals could be drawn (FIG. 8). Increased error at the higher velocities and the incapacity of the rig to run consistently at speeds higher than 60 ft/sec means that the curves show only that the increasing velocity gives increased dispersion; the extent to which this increase is diminishing or otherwise was not found. The result can be physically interpreted as meaning that at higher aircraft velocities more energy is available to the spreading mechanism on the aerodynamic spreader, in contrast to the mechanical spreader where the energy is constant.

Dimensional and Regression Analysis

The dispersion D may be represented non-dimensionally by dividing by a scale length W, where W is the width of the spreader. The ratio D/W may be related to the various variables by dimensional analysis.

Five non-dimensional groups of variables were selected on the basis that they might be expected to be included in a physical model of the spreader action and that they were involved in changes occurring in all the observations reported above.

The five are:

| | |
|---|---|
| $L/W$ | The length to width ratio |
| $d/W$ | The particle size diameter to width ratio |
| $V^2/Wg$ | Froude number |
| $\rho_a WGV/Q$ | The ratio of air momentum to material momentum through the spreader after full mixing, where $\rho_a$ is air density |
| $\theta$ | Exit angle of particle. |

A model incorporating the above groups was then tested by regression analysis using 61 observations (the total usable data).

The model was logarithmically transformed to $$\ln\left(\frac{D}{W}\right) = \ln a + b_1 \ln\left(\frac{L}{W}\right) \ldots b_5 \ln(\sin(\theta + 45))$$

before applying the analysis. With the significant coefficients established, ($P < 0.01$), the multiple correlation coefficient obtained showed that better than 90 percent of the total variation in the data was being taken into account.

Of the above five groups the fifth was not significant so that with the coefficients enumerated the model became $$\ln\left(\frac{D}{W}\right) = 3.417 + 0.571 \ln\left(\frac{L}{W}\right) + 0.487 \ln\left(\frac{d}{W}\right) + 0.232 \ln\left(\frac{V^2}{Wg}\right) + 0.235 \ln\left(\frac{\rho_a WGV}{Q}\right)$$

i.e., $$\frac{D}{W} = 29.2 \left(\frac{L}{W}\right)^{0.571} \left(\frac{d}{W}\right)^{0.487} \left(\frac{V^2}{Wg}\right)^{0.232} \left(\frac{\rho_a WGV}{Q}\right)^{0.235}$$

or as $\rho_a$ and $g$ are constant $$D = 6.44 \frac{L^{0.571} \; d^{0.487} \; V^{0.699} \; G^{0.235}}{W^{0.025} \; Q^{0.235}}$$

As the coefficients of $L$, $d$, $V$, $G$, $W$ and $Q$ can be shown not to differ significantly from ½, ½, 1, ⅓, 0 and ⅓ respectively, then the above expression can be written $$D = 2.325 \; L^{1/2} \; d^{1/2} \; V \; G^{1/3} / Q^{1/3}$$

with no significant increase in error, the expression remaining dimensionally correct.

A full size spreader was constructed to the design optimised by previous model tests and a Beaver aircraft was used to spread granulated superphosphate both with and without the spreader attached to it. The temperature, lapse rate and humidity were constant throughout the test. The highest cross wind was 1.5 m/s per second and mean crosswind 0.57 m/s per second. The trial was made at a height of 50 m. and three nominal rates of deposit of 36, 112 and 200 kg/ ha (30, 100 and 180 lbs/ acre). Half the 18 runs were with the spreader fitted and half without. Superphosphate was caught in 20 catchers spaced 2 metres apart. The results show a marked increase in swath width, expressed as a dispersion equal to 3 ½ weighted standard deviations of the deposited distribution, when the aircraft was fitted with the spreader. The results show a dependence on the rate of deposit but can be expressed in round figures as a 80 percent increase in swath width on 30 lbs per acre, 50 percent on 100 lbs per acre and 25 percent at 180 lbs per acre. These results are statistically significant and show fair agreement with the previous scale model tests providing allowance is made for the change in height and a velocity based on the propeller slip stream velocity is used rather than the aircraft velocity as before.

In the above results it will be appreciated that the illustrated spreader provides wide and even distribution of granulated material. It is cheap to construct and does not have the maintenance difficulties associated with mechanical spreaders. It has very low aerodynamic drag and is completely non-blocking. It is easy to attach and remove from an aircraft and does not impair handling in the air or on the ground. It can be constructed in any suitable material, due attention being given to erosion and corrosion resistance and to reduction of weight. It is believed that this particular spreader is of optimum design. The invention is not limited to this optimum shape, however, and it is to be understood that many variants of this shape will fall within its spirit and scope.

TABLE I

REYNOLDS NUMBERS AND FROUDE NUMBERS

| Scale | Reynolds Number | | Froude Number |
|---|---|---|---|
| | Model | Particle | Particle |
| 1/8th | $1 \times 50 \times 10^3/1.4$ = 357,140 | $0.00129 \times 50 \times 10^3/1.4$ = 460 | $50^2/0.00127 \times 32.2$ = 60,180 |
| 1/6th | $1.333 \times 57 \times 10^3/1.4$ = 533,200 | $0.00258 \times 57 \times 10^3/1.4$ = 1050 | $57^2/0.00258 \times 32.2$ = 39,700 |
| Full | $140 \times 8 \times 10^3/1.4$ = $8 \times 10^6$ | $0.01 \times 140 \times 10^3/1.4$ = $1 \times 10^4$ | $140^2/0.01 \times 32.2$ = 60,870 |

TABLE II

ANALYSES OF VARIANCE — FOR FACTOR MODEL EXPERIMENT

| Source of Variation | DF | Mean Squares | | |
|---|---|---|---|---|
| | | (1) D | (2) Q' | (3) D' |
| R Linear | 1 | 21.3640* | 0.001016 | 23.9053* |
| R Quadratic | 1 | 13.8725* | 0.011319 | 7.4180* |
| A Linear | 1 | 71.9600** | 0.035227 | 88.1069** |
| A Quadratic | 1 | 6.2084 | 0.000432 | 7.1327* |
| G Linear | 1 | 15.1617* | 1.515308*** | 26.7678** |
| G Quadratic | 1 | 12.1363* | 0.002817 | 15.3845** |
| M Linear | 1 | 463.3983*** | 2.041480*** | 7.7918* |
| M Quadratic | 1 | 0.5065 | 0.048798 | 1.2140 |
| $R_L \times M_L$ | 1 | 0.4563 | 0.064607 | 6.4637* |
| $R_L \times M_q$ | 1 | 28.7653** | 0.009725 | 19.3837** |

TABLE II—Continued

ANALYSES OF VARIANCE — FOR FACTOR MODEL EXPERIMENT

| Source of Variation | DF | Mean Squares (1) D | (2) Q' | (3) D' |
|---|---|---|---|---|
| R × M | | | | |
| $R_q × M_l$ | 1 | 18.1760* | 0.000174 | 17.1924** |
| $R_q × M_q$ | 1 | 6.2112 | 0.023968 | 1.1661 |
| Error | 12 | 2.4932 | 0.017968 | |
| Residual regression of D on Q | 1 | | | 16.4902** |
| Error after eliminating variation in Q | 11 | | | 1.2207 |

NOTE  Q' = ln Q
      D' = D − b(Q' − Q̄')   where b is regression of D on Q' in the residuals.

Expected values of D adjusted to common level of Q = Q̄' = −2.3114 in feet scaled to full size.

| | | | | | | | | | |
|---|---|---|---|---|---|---|---|---|---|
| $M_1$ | 31.09 | 37.37 | 36.57 | $A_1$ | $A_2$ | $A_3$ | $G_1$ | $G_2$ | $G_3$ |
| $M_2$ | 32.57 | 32.70 | 31.88 | 29.96 | 33.44 | 34.74 | 28.72 | 33.79 | 35.63 |
| $M_3$ | 29.88 | 30.35 | 32.02 | | | | | | |
| M | 31.18 | 33.47 | 33.49 | | | | | | |

I claim:

1. For suspension from an aircraft, a body to serve as a spreader for particulate material dropped from the aircraft, said body having a pair of upright side walls which diverge away from one another rearwardly and from a prow at the front end of the body and progressively decrease in height in the front to rear direction and a pair of ledges extending longitudinally of the side walls and projecting outwardly one from the bottom of each side wall, said side walls presenting outer surfaces which are substantially unenclosed.

2. A body as claimed in claim 1 wherein the side walls are outwardly concave.

3. A body as claimed in claim 2 wherein the side walls are of generally parabolic curvature.

4. A body as claimed in claim 3 including a top wall extending between the upper margins of the side walls.

5. A body as claimed in claim 4 wherein the top wall is substantially planar.

6. A body as claimed in claim 5 including a generally flat under-surface extending between the outer edges of the ledges.

7. A body as claimed in claim 6 wherein said under-surface is the under-surface of a flat base plate the outer parts of which define the ledges, the side walls extending up from the base plate within those outer parts.

8. A body as claimed in claim 7 wherein said base plate tapers in thickness toward sharp edges at its front, rear and outer margins.

9. A body as claimed in claim 8 wherein
   a. the length to width ratio R of said body is in the range 0.8 to 1.0,
   b. the exit angle $\theta$ of said side walls relative to the transverse direction of the body is in the range 18° to 54°, and
   c. the height G of the body is in the range 6 to 20 inches at the front thereof.

10. In combination: an aircraft having a hopper for receiving flowable material to be aerially spread, the hopper having an underside outlet opening for release of said material from the aircraft and, secured to the underside of the aircraft below and behind said opening, a body comprising a pair of upright side walls which diverge away from one another rearwardly and from a prow at the front end of the body and progressively decrease in height in the front to rear direction and a pair of ledges extending longitudinally of the side walls and projecting outwardly one from the bottom of each side wall; said side walls presenting outer surfaces which are substantially unenclosed; said body being disposed to disperse material leaving said opening during flight of the aircraft.

11. A method of aerial distribution of flowable material comprising downwardly releasing the material from a hopper of an airgoing craft such that the material is directed into airflow along at least one surface of a body carried by the craft to both accelerate and deflect the material laterally to at least one side of the airgoing craft, said surface comprising an unenclosed external side surface of said body.

12. A method as claimed in claim 11 wherein said body comprises a pair of upright side walls which diverge away from each other rearwardly of the body and progressively decrease in height rearwardly of the body, the body further including a pair of ledges extending longitudinally of the side walls and projecting outwardly one from the bottom of each side wall, said side walls each defining a separate said unenclosed external side surface and said downward releasing of material being arranged such that the material is directed into an airflow along both said side surfaces to be deflected laterally to both sides of the airgoing vehicle.

* * * * *